(12) United States Patent
Ratliff et al.

(10) Patent No.: US 10,816,371 B2
(45) Date of Patent: Oct. 27, 2020

(54) LIQUID LEVEL SENSOR WITH IMPROVED REMOVABILITY

(71) Applicant: MAG Aerospace Industries, LLC, Carson, CA (US)

(72) Inventors: Robert G. Ratliff, Buena Park, CA (US); Oscar Mathews, Aliso Viejo, CA (US); David A. Beach, Los Alamitos, CA (US); Christopher Jin Sung Choi, Anaheim, CA (US); David J. Kim, Buena Park, CA (US); Razmik B. Boodaghians, Glendale, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 237 days.

(21) Appl. No.: 15/963,606

(22) Filed: Apr. 26, 2018

(65) Prior Publication Data

US 2018/0313675 A1  Nov. 1, 2018

Related U.S. Application Data

(60) Provisional application No. 62/490,255, filed on Apr. 26, 2017.

(51) Int. Cl.
| | |
|---|---|
| *G01D 11/24* | (2006.01) |
| *G01F 23/24* | (2006.01) |
| *E03D 11/13* | (2006.01) |
| *G01F 23/26* | (2006.01) |
| *G01F 23/00* | (2006.01) |
| *B64D 11/02* | (2006.01) |

(52) U.S. Cl.
CPC ............ *G01D 11/245* (2013.01); *E03D 11/13* (2013.01); *G01F 23/0007* (2013.01); *G01F 23/24* (2013.01); *G01F 23/26* (2013.01); *B64D 11/02* (2013.01)

(58) Field of Classification Search
CPC ... G01D 11/245; G01F 23/0007; G01F 23/24; G01F 23/26; E03D 11/13; B64D 11/02
See application file for complete search history.

(56) References Cited

U.S. PATENT DOCUMENTS

5,035,011 A * 7/1991 Rozenblatt ............. B64D 11/02
4/316
9,718,549 B2  8/2017 Hennings et al.
(Continued)

*Primary Examiner* — David Z Huang
(74) *Attorney, Agent, or Firm* — Kilpatrick Townsend & Stockton LLP (57) ABSTRACT

Embodiments of the present disclosure relate generally to a liquid level sensor system that allows ease of connection and disconnection of a removable vessel (such as a toilet bowl) from a stationary unit (such as a toilet frame). The system provides at least one liquid level sensor (a first part of the sensor probe connection) mounted to the removable vessel, a liquid level sensor circuit board mounted to the unit, and a connection feature (a second part of a sensor probe connection) configured to extend between the sensor and the circuit board. When the removable vessel is removed from the vessel, the sensor probe connection is disconnected without the need for manual intervention. Installation of multiple probes and varying their location can support detection of a single or several discrete levels, or provide for any required redundancy of detection.

8 Claims, 10 Drawing Sheets

(56) References Cited

U.S. PATENT DOCUMENTS

| | | | |
|---|---|---|---|
| 2008/0084005 A1* | 4/2008 | Steele | B60R 21/01 264/272.14 |
| 2011/0174067 A1* | 7/2011 | Boiarski | A61F 5/4404 73/149 |
| 2015/0164422 A1* | 6/2015 | Lee | A61B 5/14552 600/301 |

* cited by examiner

LIQUID LEVEL SENSOR WITH IMPROVED REMOVABILITY

CROSS REFERENCE TO RELATED APPLICATIONS

This application claims the benefit of U.S. Provisional Application Ser. No. 62/490,255, filed Apr. 26, 2017, titled "Liquid Level Sensor with Improved Removability," the entire contents of which are hereby incorporated by reference.

FIELD OF THE DISCLOSURE

Embodiments of the present disclosure relate generally to a liquid level sensor system that allows ease of connection and disconnection of a removable vessel (such as a toilet bowl) from a stationary unit (such as a toilet frame). The system provides at least one liquid level sensor (a first part of the sensor probe connection) mounted to the removable vessel, a liquid level sensor circuit board mounted to the unit, and a connection feature (a second part of a sensor probe connection) configured to extend between the sensor and the circuit board. When the removable vessel is removed from the vessel, the sensor probe connection is disconnected without the need for manual intervention. Installation of multiple probes and varying their location can support detection of a single or several discrete levels, or provide for any required redundancy of detection. Further, by changing the placement of the electrodes and altering the detection circuit allows for continuous level measurement or a combination of discrete and continuous detection while maintaining ease of serviceability.

BACKGROUND

Liquid level sensors used in monitoring the level of liquids onboard aircraft (or other passenger transportation vehicle) equipment—such as toilet bowls, water tanks, gray water tanks, or other liquid-containing vessels—are important in order to prevent flooding or system shutdown. The risk of flooding most often occurs when the supply valve seals leak due to fouling from poor water quality or irregular maintenance, but may be the result of mechanical wear or external control failure. Occasionally, a failed sensor or related component needs to be replaced in order to prevent such problems from occurring. For example, a liquid level sensor could develop defects due to wear and tear, may be subject to manufacturing defects, or may otherwise experience system incompatibility. Liquid level sensor failure can lead false reporting of leakage or failure to report leakage. Replacement of liquid level sensors or related components can lead to flight delays and even flight cancellations when the maintenance effort is complicated due to restricted access or tools required. For these reasons, it is desirable to employ a liquid level sensor and related components in a way that provides for ease of access/removability and durability.

The present disclosure thus describes a liquid level sensor system with features that provide ease of assembly, disassembly, removability, interchangeability, ease of maintenance, modularity, and/or endurance. The system described herein is lightweight and compact. It provides ease of integration with the vehicle water and waste system. It further provides for accurate sensing of liquid levels for all types of water and waste equipment on board vehicles. This system can support detection of a single level or several discrete levels, and in alternate arrangement, can provide continuous level measurement or a combination of discrete and continuous detection. Specific embodiments are described with respect to aircraft waste and water systems, but it should be understood that this disclosure may relate to other passenger transportation vehicles as well.

BRIEF SUMMARY

Embodiments of the invention described herein thus provide systems and methods for a sensor system, comprising: a first part of a sensor probe connection coupled to a removable vessel; a second part of a sensor probe connection coupled to a connection conduit; wherein the first part and the second part are secured via removable cooperation; the connection conduit secured to a circuit board of a stationary unit, such that removal of the removable vessel from the stationary unit allows disconnection between the first part and the second part of the sensor probe connection.

In another example, cooperation between the first part and the second part provides electrical conductivity between the first part and the circuit board.

In any of the preceding or subsequent examples, the removable cooperation may comprise a snap configuration. The snap configuration may be a male snap component and a female snap component. The snap configuration may be electrically conductive, capacitive, or inductive snap components. The snap configuration may be marine snaps.

In any of the preceding or subsequent examples, the removable cooperation comprises a magnetic configuration or a dove tail and slot configuration.

In any of the preceding or subsequent examples, the removable vessel comprises a removable toilet bowl. The stationary unit may be a toilet frame.

In any of the preceding or subsequent examples, there may be a support member associated with the connection between the second part of the sensor probe connection and the connection conduit.

In any of the preceding or subsequent examples, there may be an overmold associated with the second part of the sensor probe connection.

In any of the preceding or subsequent examples, a first end of the connection conduit is associated with the second part of the sensor probe connection and a second end of the connection conduit is associated with the circuit board. The sensor system may be a liquid level sensor system. The sensor system may be mounted on an aircraft toilet system.

In a further example, there is provided a liquid level sensor system for use within aircraft toilet system, comprising: a first part of a sensor probe connection coupled to a removable toilet bowl, the first part comprising a first snap feature; a second part of a sensor probe connection coupled to a connection conduit, the second part comprising a corresponding snap feature; an overmold configured to cover the second part of the sensor probe connection; the connection conduit secured to a circuit board of a toilet frame, wherein removal of the removable toilet bowl from the stationary unit allows disconnection between the first part and the second part for ease of removal of the removable toilet bowl. There may further be a mounting bracket provided that secures the circuit board to the toilet frame.

DETAILED DESCRIPTION

Embodiments of the present disclosure provide a conductive probe and accompanying connections that function as a liquid level sensor system 10. Although described in connection with an aircraft toilet system, it should be understood that the liquid level sensor system 10 described herein may be used in connection with any liquid-containing system and/or on any type of passenger transportation vehicle that supports one or more liquid-containing vessels. The general intent is to provide a sensor system that has a low cost component associated with the liquid holding vessel, and to electrically connect the sensor system with a circuit board that can be mounted on a more stationary unit. The vessel supports a first part of the sensor probe connection and a connection conduit supports a second part of the sensor probe connection. A removable cooperation feature is provided between the first and second parts of the sensor probe connection. In a specific example, the removable cooperation is provided via a snap configuration, such as a marine snap system.

Figure 1:
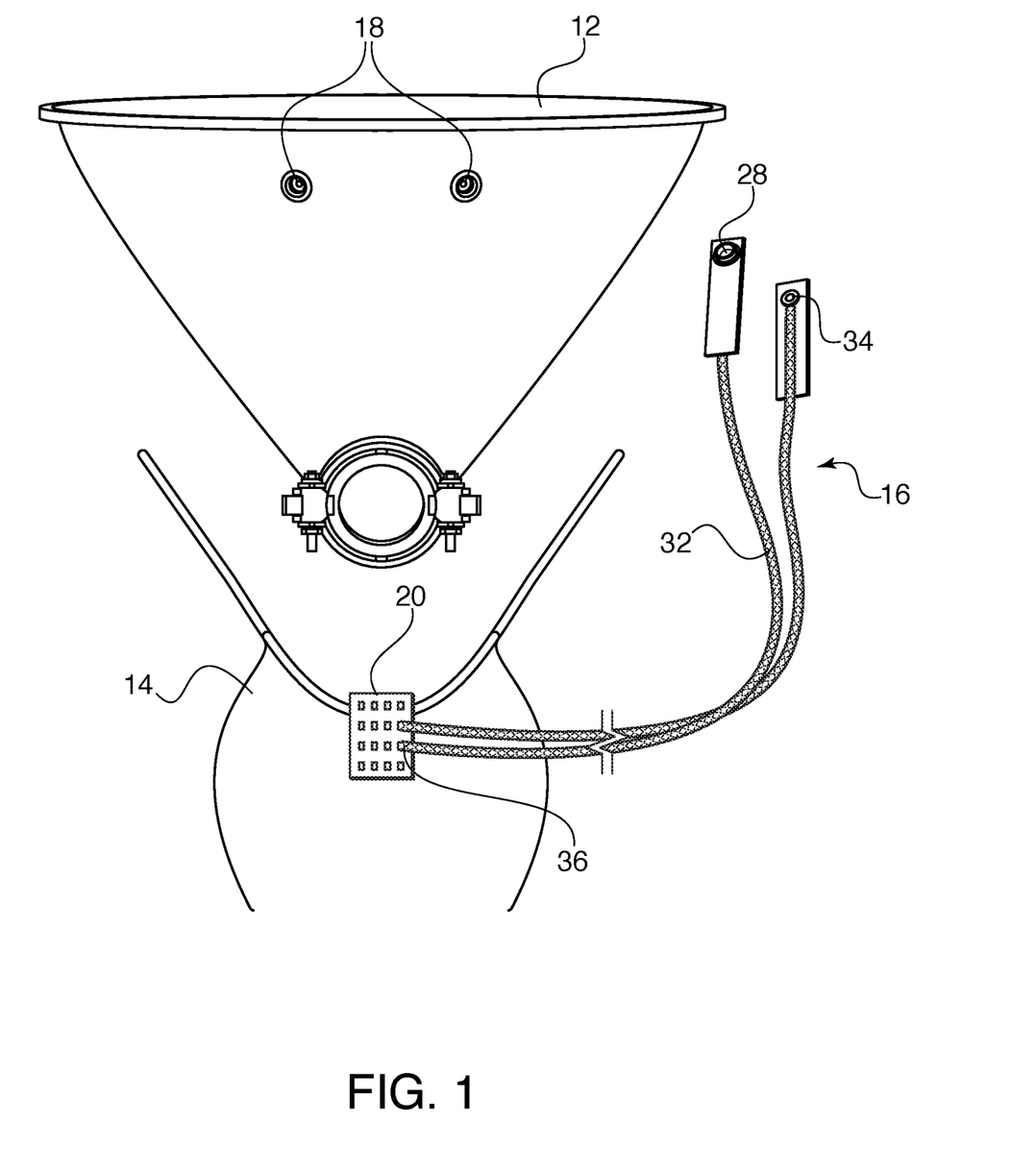
FIG. 1 shows a schematic view of one embodiment of a sensor system described herein.

In the example illustrated by FIG. 1, the liquid holding vessel is a removable toilet bowl 12, and the stationary unit is a toilet frame 14. (Throughout the remainder of this disclosure, it should be understood that reference to a removable toilet bowl may be any type of liquid-holding vessel. Reference to a toilet frame may be any type of stationary unit that supports a circuit board.) A connection feature 16 provides electrical cooperation between at least one sensor 18 on the toilet bowl 12 and the circuit board 20 of the toilet frame 14.

Figure 2:
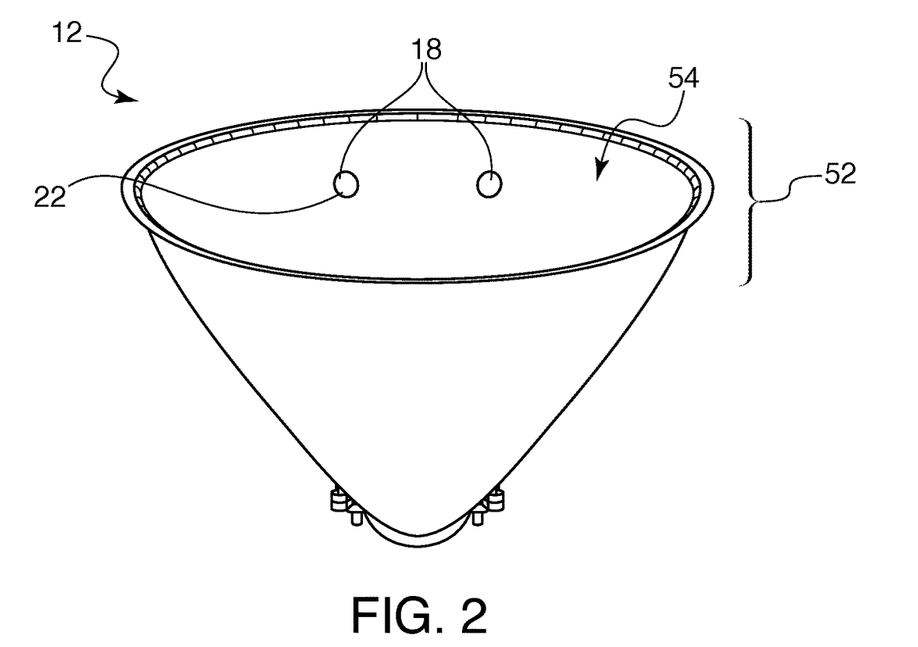
FIG. 2 shows a perspective view of a removable toilet bowl having two sensors positioned therein.
Figure 3:
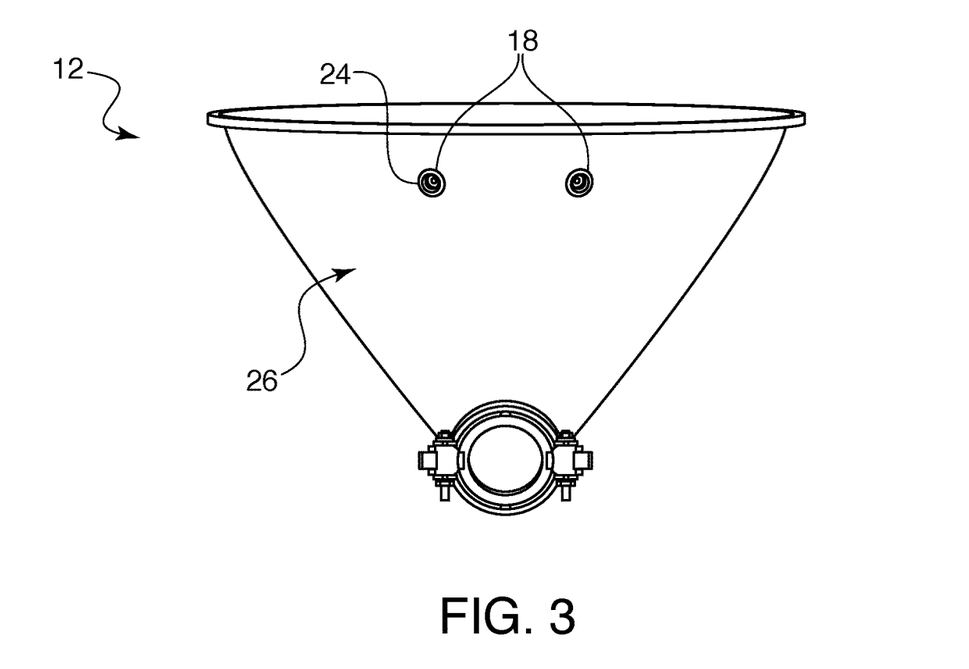
FIG. 3 shows a rear plan view of the toilet bowl of FIG. 2
Figure 4:
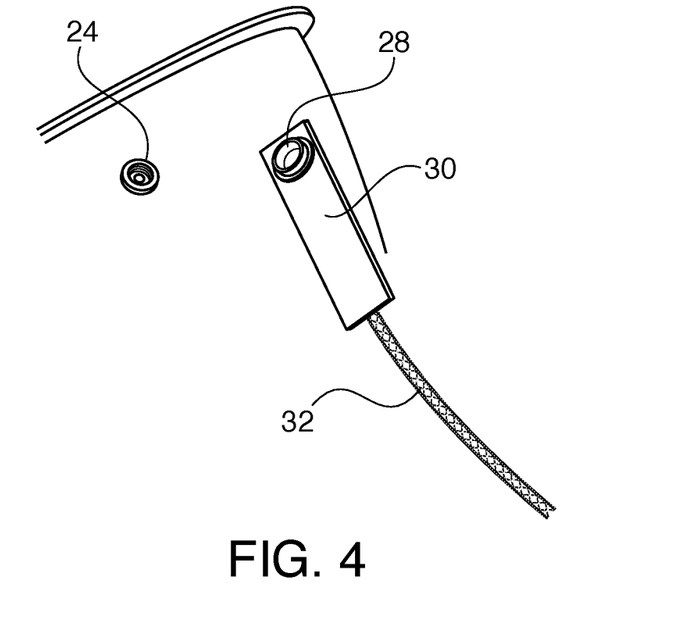
FIG. 4 shows a side perspective view of one portion of a sensor prior to its cooperation with a corresponding feature.
Figure 5:
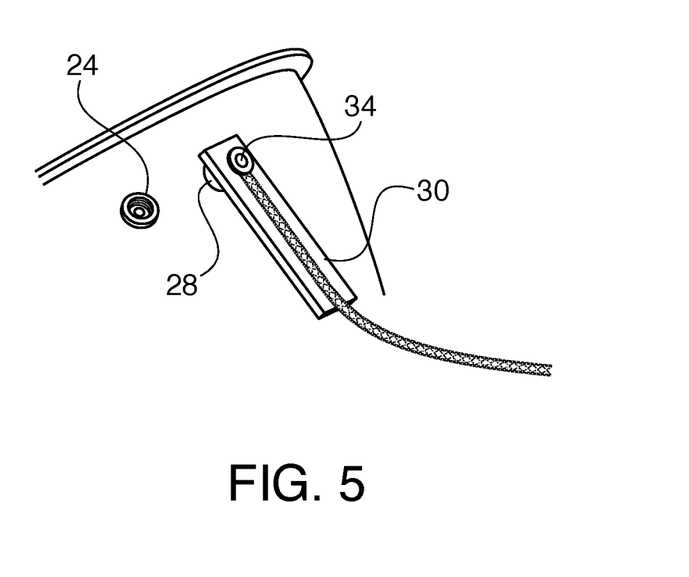
FIG. 5 shows the configuration of FIG. 4, just prior to connection (or just after disconnection).

As illustrated by FIGS. 2 and 3, one example of a sensor 18 is illustrated. These images show two sensors 18 positioned along a upper rim 52 of a toilet bowl 12. It should be understood that only a single sensor 18 may be provided or that more than two sensors 18 may be provided. (It has been found useful to provide at least two sensors in order to provide the redundancy required by some federal and other regulations.) The sensors 18 are positioned such that an overflow event can be quickly detected. The sensors 18 are generally made of a conductive material, such that they can relate conductivity through a conduit, described further below. In a specific example, the sensors are marine snaps (e.g., such as the type of snaps used to secure a boat canvas cover to a boat or other vessel). Exemplary marine snaps are illustrated by FIGS. 4 and 5. The snap head 22 may be positioned such that it faces the interior 54 of the toilet bowl 12. The snap head 22 is positioned to come into contact with liquid filling the liquid-containing vessel. Due to its material, it relays conductivity information.

The snap base 24 (the other end of one half of the marine snap system) may be positioned such that it extends through to the exterior surface 26 of the toilet bowl 12. In a specific example, openings may be bored or otherwise provided through the toilet bowl 12 in order to receive the sensors 18/snaps. The sensor 18 (in this example, shown as a snap) remains permanently connected to the toilet bowl 12. Because these features are low cost elements, it is possible to maintain a low cost of the toilet bowl itself, even with the sensors integrated therewith. This is the first part of the sensor probe connection.

As shown by FIGS. 4 and 5, the snap base 24 is configured to cooperate with a corresponding feature 28 that provides the second part of the sensor probe connection. In a specific embodiment, the corresponding feature 28 is a male snap feature that corresponds to a female snap base 24. It should be understood, however, that the male and female features may be reversed. It should also be understood that sensor connection features other than snaps may be used. For example, the connection may be via magnetic features, dove tail and groove features, or any other appropriate connection. Additionally, the electrical signal between the probe and sensor electronics may be coupled by means of capacitance or induction, thereby allowing the probe and signal connection to be bonded or molded in place without a requiring a hole or hardware that may compromise the container integrity.

Regardless of the type of connection system employed, the corresponding feature 28 may generally be associated with a support member 30. If provided, support member 30 is designed to provide stability to the connection. For example, when pressure is applied to the corresponding feature 28, the support member 30 can help ensure ease of separation. The support member 30 may be a rigid strip positioned at the back of the feature 28, and in some instances, surrounding the feature 28.

Figure 6:
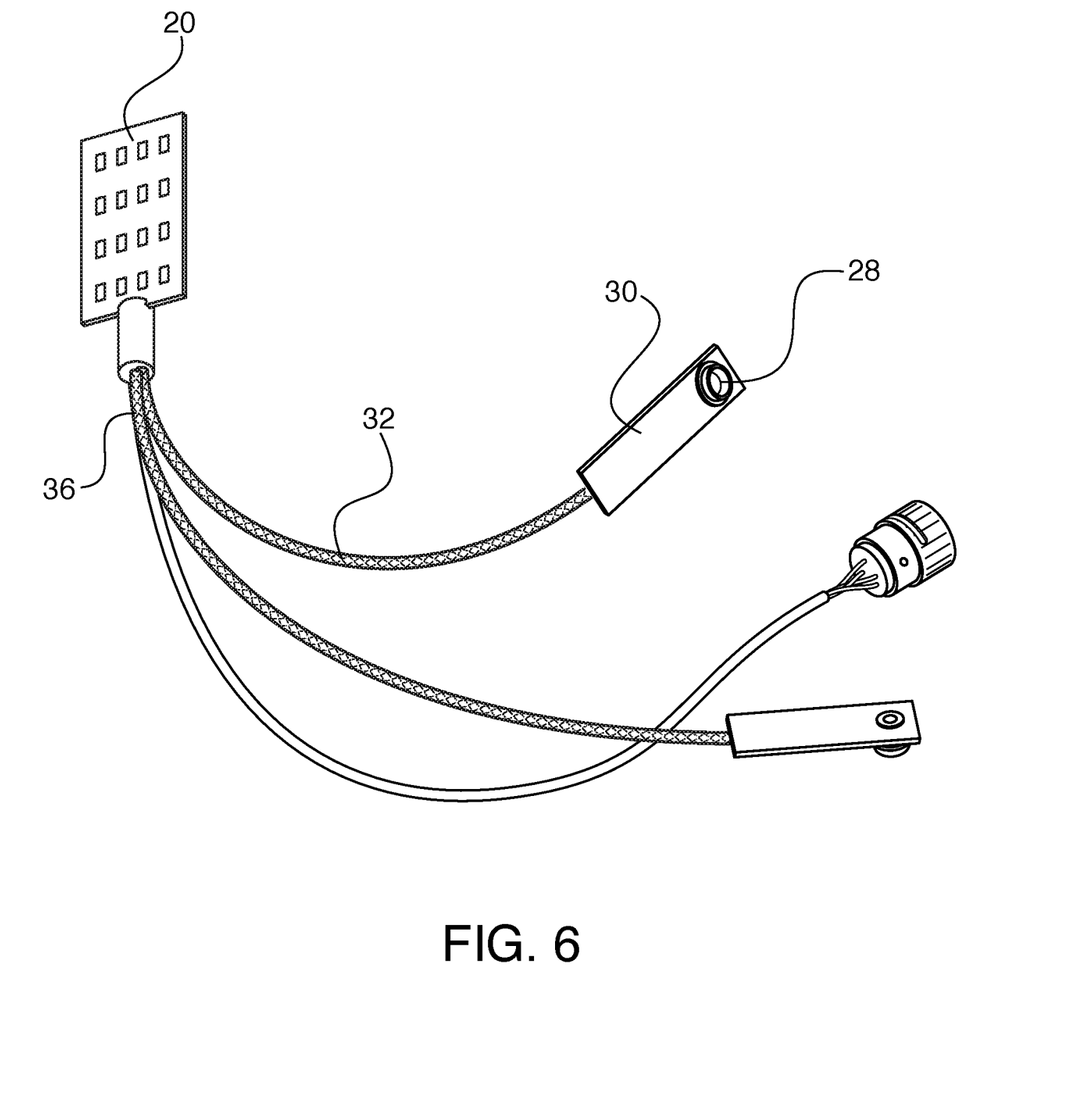
FIG. 6 shows one embodiment of a connection conduit.

Corresponding feature 28 is also associated with a connection conduit 32, shown more fully in FIG. 6. Connection conduit 32 has one end 34 that maintains electrical conductivity with the corresponding feature 28. In some examples, the feature 28 and connection conduit 32 are soldered, welded, crimped, or otherwise mechanically and/or electrically attached to one another. Connection conduit 32 has a second end 36 that maintains electrical conductivity with the circuit board 20. This connection may be similar. In a specific example, connection conduit 32 is designed to be secured to the circuit board 20 at end 36 such that, although it may be removed upon (and for) servicing, it is generally intended to maintain such connection/cooperation until manually disconnected.

Figure 7:
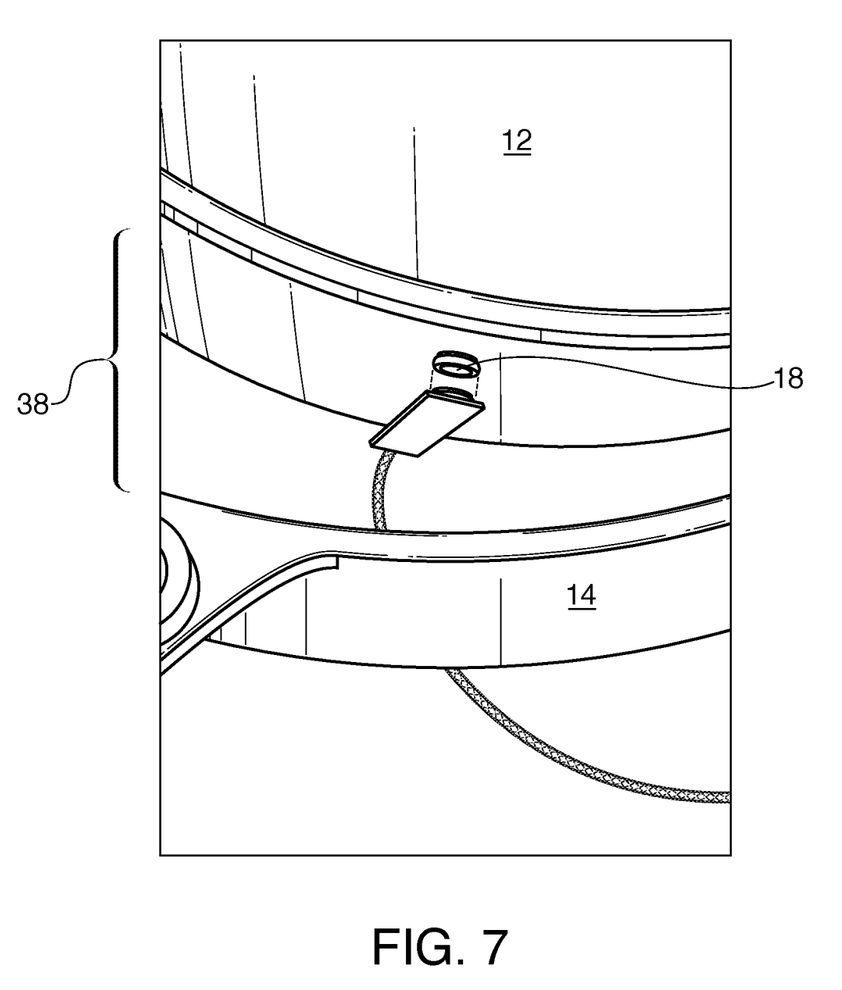
FIG. 7 shows the removable toilet bowl being removed from a toilet frame.

In the specific embodiments shown, it has been found that a snapped connection can provide a quick release between the vessel 12 and the unit 14, eliminating any sequence dependency and without requiring manual intervention. Simply pulling the vessel 12 away from its seated position, as illustrated by FIG. 7, causes separation between sensor 18 and corresponding feature 28. (This safely separates the sensor probe connection without consequence to wiring or attachments. When connected, liquid levels reaching the sensor 18 of the vessel 12 are relayed to the circuit board 20, alerting the system to a potentially hazardous high liquid level.) Due to this removable attachment, for removal of the vessel 12, personnel does not need to reach into the space 38 created between the vessel 12 and the unit 14. Further, a sightline is not required and no tools or other implements need to be positioned into the space 38 between the vessel 12 and the unit 14. This connection between sensor 18 and corresponding feature 28 allows complete separation between the electrical connection between the sensor 18 of the toilet bowl (vessel) 12 and the corresponding feature 28 of the toilet frame (unit) 14.

Figure 8:
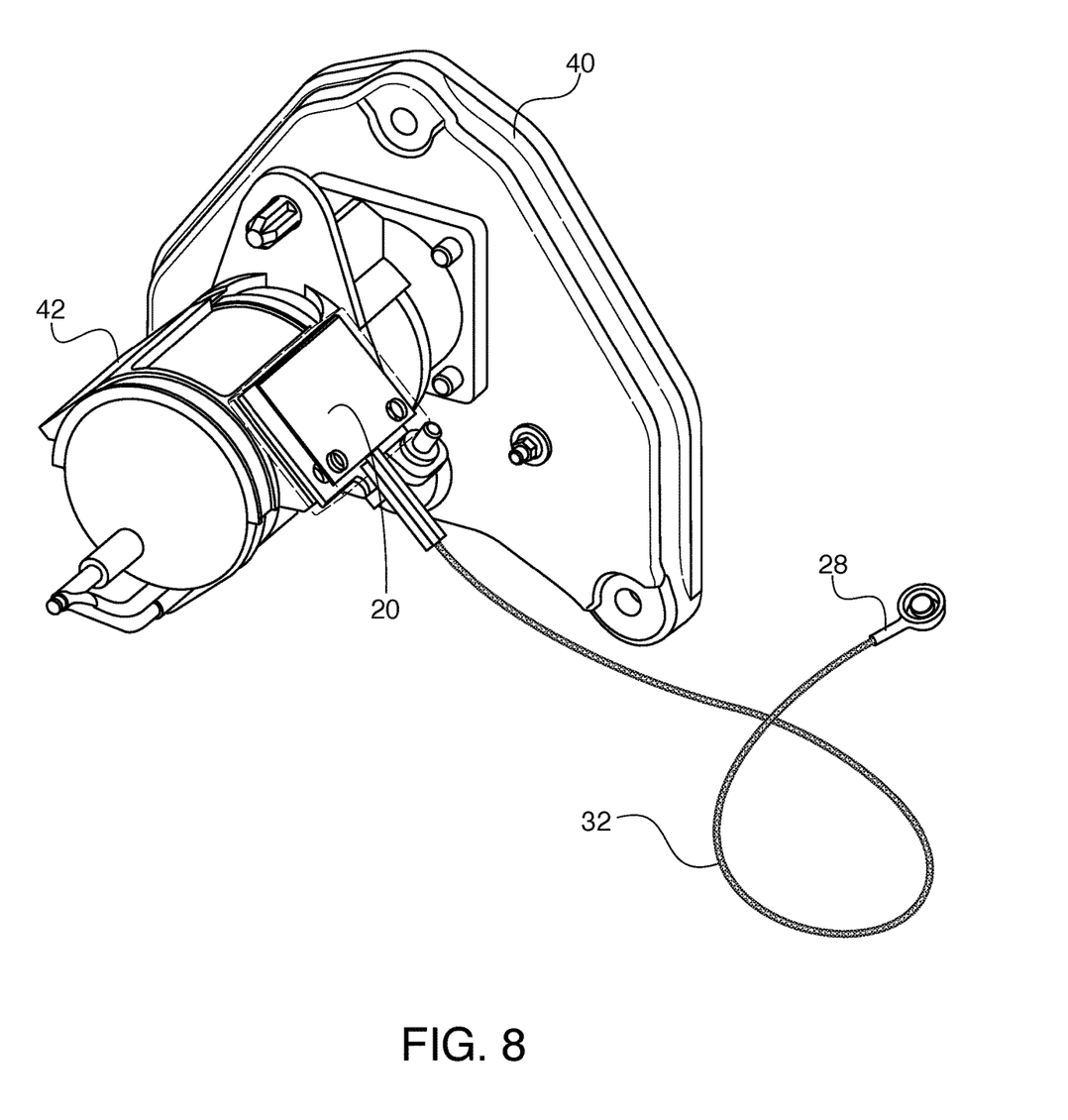
FIG. 8 shows a flush control cover and corresponding bracket used to connect a circuit board to the flush control cover.

When snapped together (or otherwise coupled, depending upon alternate connection options), the conductivity from the sensor 18 secured to the toilet bowl 12 is relayed to the corresponding snap feature 28, which is relayed to the circuit board. When the snapped cooperation is disengaged, the toilet bowl 12 with embedded sensor probe 18 can be completely removed. FIG. 8 illustrates that the connection conduit 32 and corresponding feature 28 remain connected to the circuit board 20 and the flush control cover 40. FIG. 8 also illustrates a mounting bracket 42 that may be used to secure the circuit board 22 the flush control cover 40, described further below.

Figure 9:
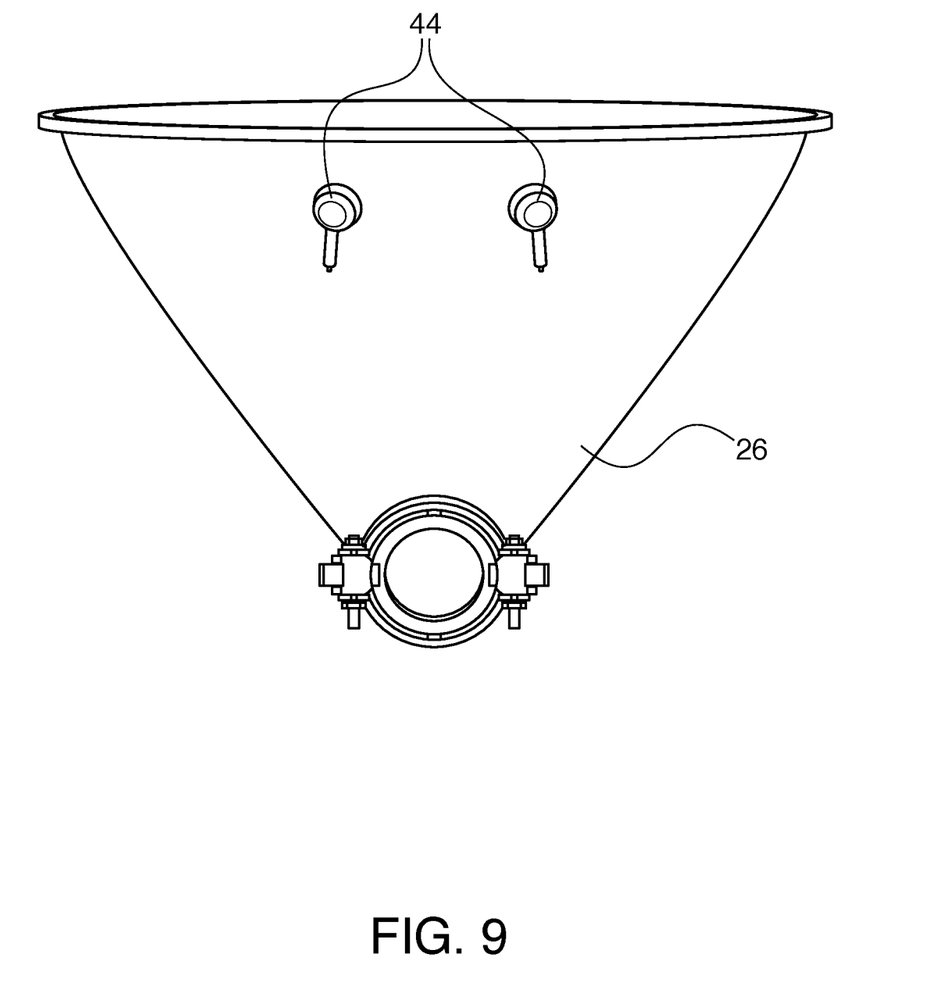
FIG. 9 shows a rear plan view of an overmold in position on a toilet bowl.
Figure 10:
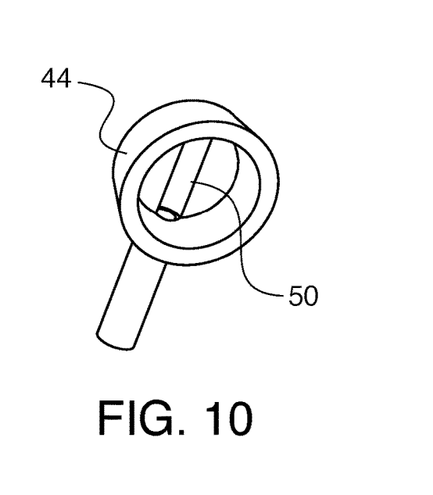
FIG. 10 shows a front perspective view of an overmold, without a corresponding feature positioned therein.
Figure 11:
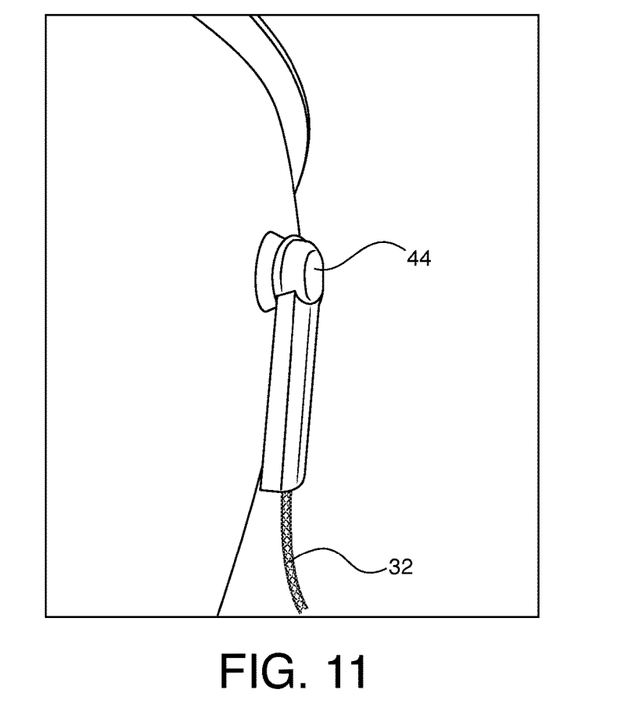
FIG. 11 shows a perspective view of an assembled system positioned on an external surface of a toilet bowl.
Figure 12:
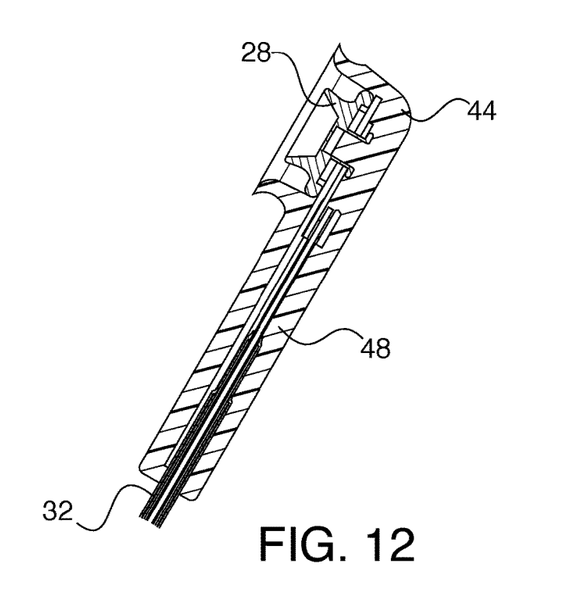
FIG. 12 shows a side cross-sectional view of an overmold 44 with a corresponding feature 28 positioned therein.
Figure 13:
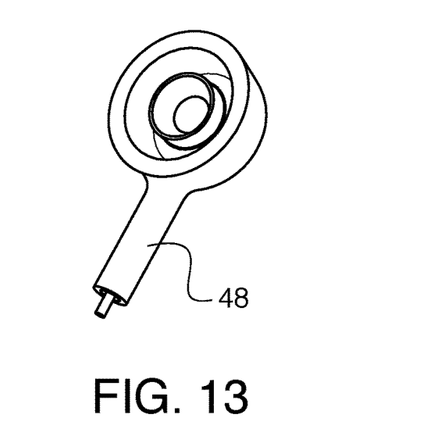
FIG. 13 shows a front perspective view of the overmold of FIG. 12.

FIG. 9 illustrates an example of an overmold 44 that may be positioned around the corresponding feature 28. Overmold 44 creates a seal against the vessel surface 26 to prevent dust, waste, or other liquid ingression into the connection area. Overmold 44 can also help ensure that the cooperation between the snap base 24 and the corresponding feature 28 is robust and secure. In a specific example, the overmold 44 may be formed around the corresponding feature 28 and may also receive and support the connection conduit 32. Examples are illustrated by FIGS. 10-14. In one example, the over mold may have an elongated handle 48, which can help provide mechanical leverage. In specific examples, the overmold is able to withstand abuse forces of up to five newtons. The over mold 44 may be made of rubber, silicone, nitrile, neoprene, viton, or any combination thereof, such that it can conform to the exterior shape of the bowl. An internal cup 50 receives and secures the second portion of the sensor probe connection (corresponding feature 28) therein.

Figure 14:
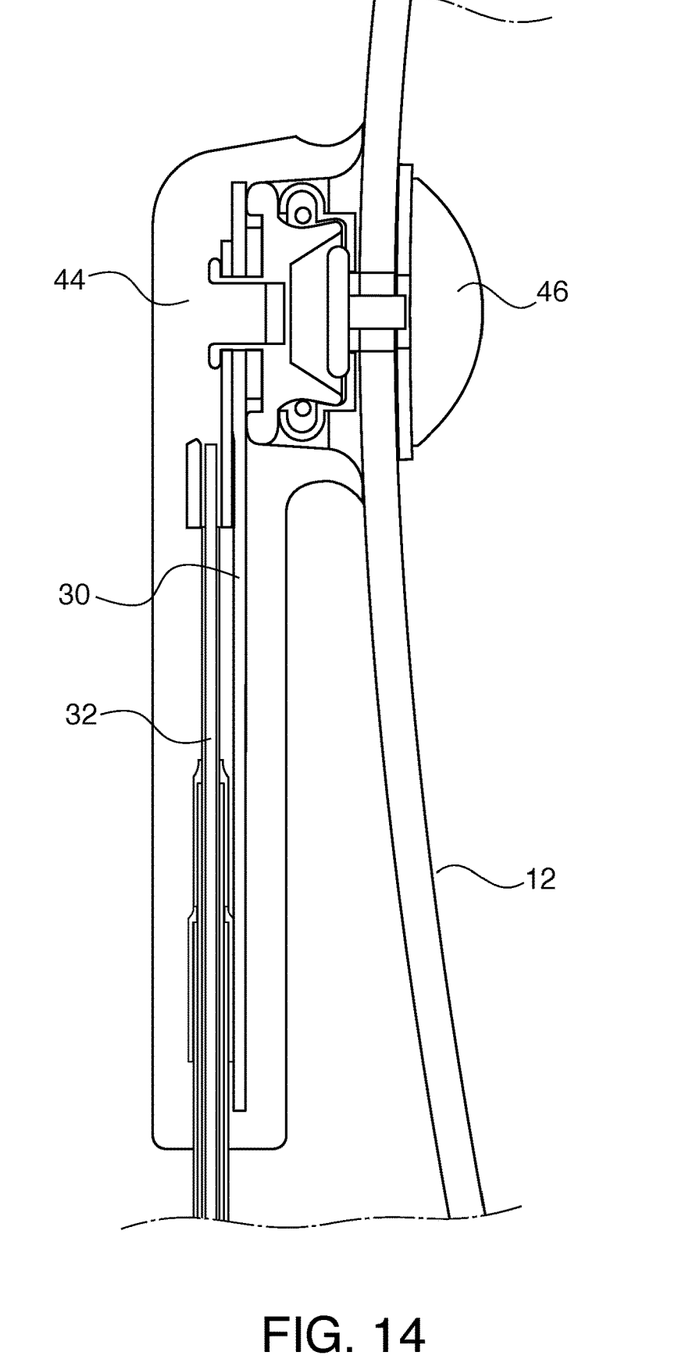
FIG. 14 shows a side cross-sectional view of the assembled system.

Specifically, FIG. 14 shows how a specific embodiment of a snap system 46 may be used to attach a harness/connection conduit to the bowl 12. For corrosion resistance and to maintain an optimal electrical connection, the interface may be shielded to prevent splashing and dust ingress via overmold 44. The removable portion of the snap system 46 and the wires of the connection conduit 32 may be secured into the molding 44. When the male part of the snap is released from the female part of the snap, the harness/connection conduit 32 is disconnected from the sensor probe 18 (the first portion of the sensor probe connection). This means that the vessel/toilet bowl 12 may be removed from the stationary unit/toilet frame 14 without any additional steps; simply pulling or otherwise applying pressure to the vessel 12 causes detachment between the two portions of the snap system 46.

Figure 15:
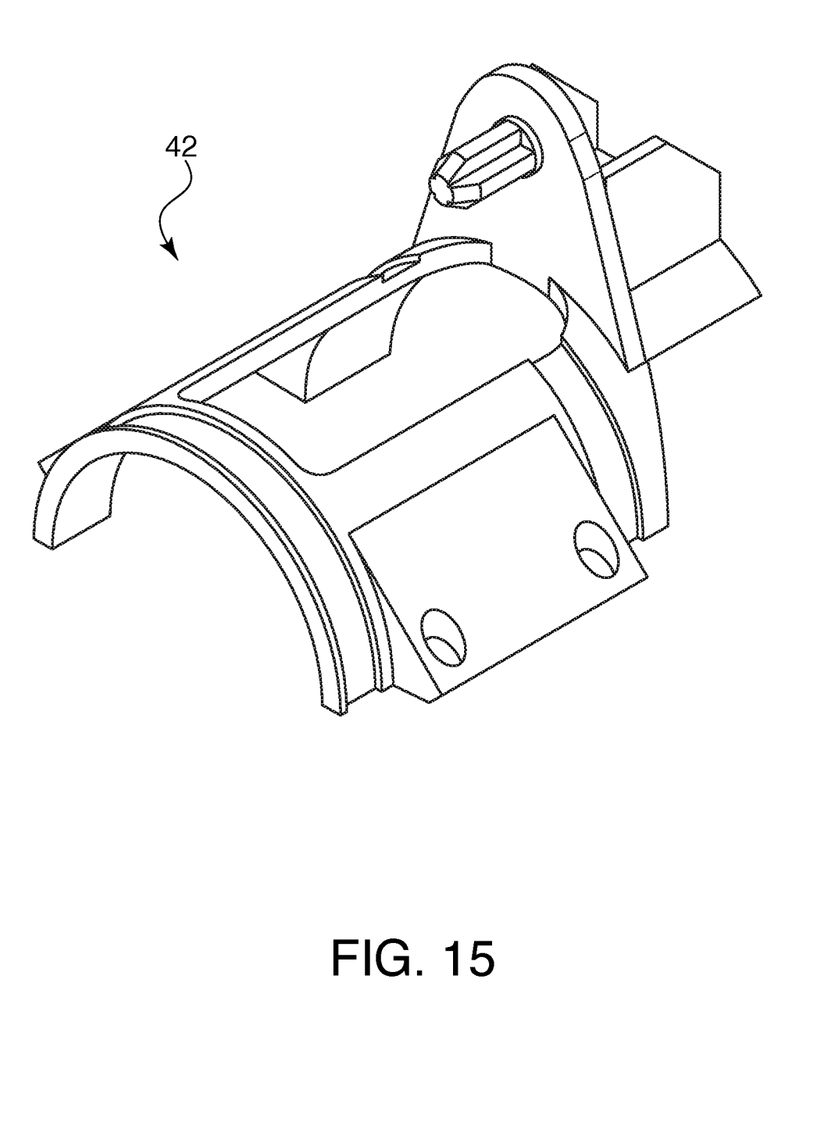
FIG. 15 shows a side perspective view of a mounting bracket.

FIG. 15 shows the mounting bracket 42, which may be used to mount the circuit board 20 to the flush control cover 40. The mounting bracket 42 generally has a U-shaped configuration such that it corresponds to a cylindrical object.

In a specific example, the mounting bracket 42 is made from a polymeric material. Non-limiting examples include polyether ether ketone (PEEK), polyetherimide (PEI), polyethylene (PE), or any other appropriate polymeric material produced by injection molding, thermoforming, additive manufacturing, or other means. The mounting bracket 42 may be secured to the cover 40 using any appropriate attachment mechanisms. This design provides a compact and lightweight support housing/bracket 42 designed for the electrical circuit board 20.

As described, providing the disclosed liquid level sensor with improved removability provides a mechanical design with features that ease assembly, mounting, disassembly, and removal of the liquid level sensor components to and from the electrical circuit board and circuit board housing. Use of a low cost electrical sensor such as the described marine snaps helps lower overall costs of the system. The modularity provided allows any problematic component to be replaced without the need for replacing the entire liquid level sensor/detection system. The disclosed system may be easily integrated into a water/waste system of a vehicle. It allows removal of a removable vessel without the need for removal of additional equipment, such as the toilet frame, the tank of the system, or other components. The system supports interchangeability and replacement of failed parts helps avoid aircraft delays and provides improved maintenance and servicing processes.

Changes and modifications, additions and deletions may be made to the structures and methods recited above and as shown in the drawings without departing from the scope or spirit of the disclosure or the following claims.

What is claimed is:

1. A liquid level sensor system for use within aircraft toilet system, comprising:
   a first part of a sensor probe connection coupled to a removable toilet bowl, the first part comprising a first snap feature;
   a second part of a sensor probe connection coupled to a connection conduit, the second part comprising a corresponding snap feature;
   an overmold configured to cover the second part of the sensor probe connection;
   the connection conduit secured to a circuit board of a toilet frame;
   wherein removal of the removable toilet bowl from the toilet frame allows disconnection between the first part and the second part for removal of the removable toilet bowl.

2. The system of claim 1, wherein cooperation between the first part and the second part provides electrical conductivity between the first part and the circuit board.

3. The system of claim 1, wherein the snap feature and the corresponding snap feature comprise a male snap component and a female snap component.

4. The system of claim 1, wherein the snap feature and the corresponding snap feature comprise electrically conductive, capacitive, or inductive snap components.

5. The system of claim 1, wherein the snap feature and the corresponding snap feature comprise marine snaps.

6. The system of claim 1, further comprising a support member associated with the connection between the second part of the sensor probe connection and the connection conduit.

7. The system of claim 1, wherein a first end of the connection conduit is associated with the second part of the sensor probe connection and wherein a second end of the connection conduit is associated with the circuit board.

8. The method of claim 1, further comprising a mounting bracket securing the circuit board to the toilet frame.

\* \* \* \* \*